(12) United States Patent
Donderici

(10) Patent No.: US 9,690,004 B2
(45) Date of Patent: Jun. 27, 2017

(54) HOLD-UP TOOL WITH CONFORMABLE SENSORS FOR HIGHLY-DEVIATED OR HORIZONTAL WELLS

(71) Applicant: Halliburton Energy Services, Inc., Houston, TX (US)

(72) Inventor: Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 133 days.

(21) Appl. No.: 14/440,498

(22) PCT Filed: Sep. 30, 2014

(86) PCT No.: PCT/US2014/058285
§ 371 (c)(1),
(2) Date: May 4, 2015

(87) PCT Pub. No.: WO2015/050864
PCT Pub. Date: Apr. 9, 2015

(65) Prior Publication Data
US 2015/0285939 A1    Oct. 8, 2015

Related U.S. Application Data

(60) Provisional application No. 61/886,398, filed on Oct. 3, 2013.

(51) Int. Cl.
*G01V 3/28* (2006.01)
*E21B 47/10* (2012.01)
*E21B 49/08* (2006.01)

(52) U.S. Cl.
CPC .............. *G01V 3/28* (2013.01); *E21B 47/102* (2013.01); *E21B 49/087* (2013.01)

(58) Field of Classification Search
USPC ............ 324/324; 73/152.01, 152.03, 152.54, 73/152.57, 152.59
See application file for complete search history.

(56) References Cited

U.S. PATENT DOCUMENTS

| 4,763,520 A | 8/1988 | Titchener et al. |
| 5,631,413 A | 5/1997 | Young et al. |
| 6,650,280 B2 * | 11/2003 | Arndt .................... G01F 23/284 342/124 |

(Continued)

OTHER PUBLICATIONS

International Preliminary Report on Patentability issued in related Application No. PCT/US2014/058285, mailed Apr. 14, 2016 (7 pages).

(Continued)

*Primary Examiner* — Vincent Q Nguyen
(74) *Attorney, Agent, or Firm* — Benjamin Fite; Baker Botts L.L.P.

(57) ABSTRACT

An example method for downhole fluid measurement may include positioning a first sensor within a downhole casing. The first sensor may include a first flexible material, a first transmitter coupled to the first flexible material, and a first receiver coupled to the first flexible material. A first signal within a fluid in the downhole casing may be generated using the first transmitter. A first response of the fluid to the first signal may be measured using the using the first receiver. The first response may be processed to determine at least one parameter of the fluid.

16 Claims, 6 Drawing Sheets

(56) References Cited

U.S. PATENT DOCUMENTS

| | | | |
|---|---|---|---|
| 8,215,164 B1 | 7/2012 | Hussain et al. | |
| 2008/0307877 A1* | 12/2008 | Cook | E21B 43/11 |
| | | | 73/152.57 |
| 2009/0166085 A1* | 7/2009 | Ciglenec | E21B 49/08 |
| | | | 175/24 |
| 2009/0242317 A1* | 10/2009 | Tashiro | G01V 11/005 |
| | | | 181/106 |
| 2010/0165788 A1* | 7/2010 | Rayssiguier | G01V 1/16 |
| | | | 367/25 |
| 2013/0075091 A1 | 3/2013 | Hallundbaek | |

OTHER PUBLICATIONS

Goldfine, Neil, "Surface-Mounted Eddy-Current Sensors for On-Line Monitoring of Fatigue Tests and for Aircraft Health Monitoring", Second Joint NASA/FAA/DoD Conference on Aging Aircraft, Aug. 1998.

Goldfine, Neil et al, "Conformable Eddy-Current Sensors and Arrays for Fleetwide Gas Turbine Component Quality Assesment", ASME Journal of Engineering for Gas Turbines and Power, vol. 124, No. 4, pp. 904-909, Oct. 2002.

Goldfine, Neil, "MWM-Array Eddy Current Sensors for Detection of Cracks in Regions with Fretting Damage", ASNT Materials Evaluation, Jul. 2002, vol. 60, No. 7.

International Search Report and Written Opinion issued in related PCT Application No. PCT/US2014/058285 mailed Jan. 15, 2015, 10 pages.

* cited by examiner

HOLD-UP TOOL WITH CONFORMABLE SENSORS FOR HIGHLY-DEVIATED OR HORIZONTAL WELLS

CROSS-REFERENCE TO RELATED APPLICATION

The present application claims priority to U.S. Provisional Patent Application No. 61/886,398, filed Oct. 3, 2013 and titled "Hold-Up Tool with Conformable Sensors for Highly-Deviated or Horizontal Wells," and is a U.S. National Stage Application of International Application No. PCT/US2014/058285 filed Sep. 30, 2014, both of which are incorporated herein by reference in their entirety for all purposes.

BACKGROUND

The present disclosure relates generally to downhole drilling operations and, more particularly, to a hold-up tool with conformable sensors for highly-deviated or horizontal wells. Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

In certain operations, the wellbore may include portions that are vertical with respect to a surface of the formation as well has portions that are highly-deviated from vertical, including sections that are horizontal or near horizontal with respect to the surface. When a well is producing hydrocarbons from a horizontal or near horizontal section, the hydrocarbons may flow with other fluids in a production casing within the horizontal or near horizontal section. In certain instances, a hold-up tool may be positioned in the production casing to characterize the flow of hydrocarbons, which may reflect downhole conditions and may affect the speed with which hydrocarbons are recovered at the surface.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

Figure 1:
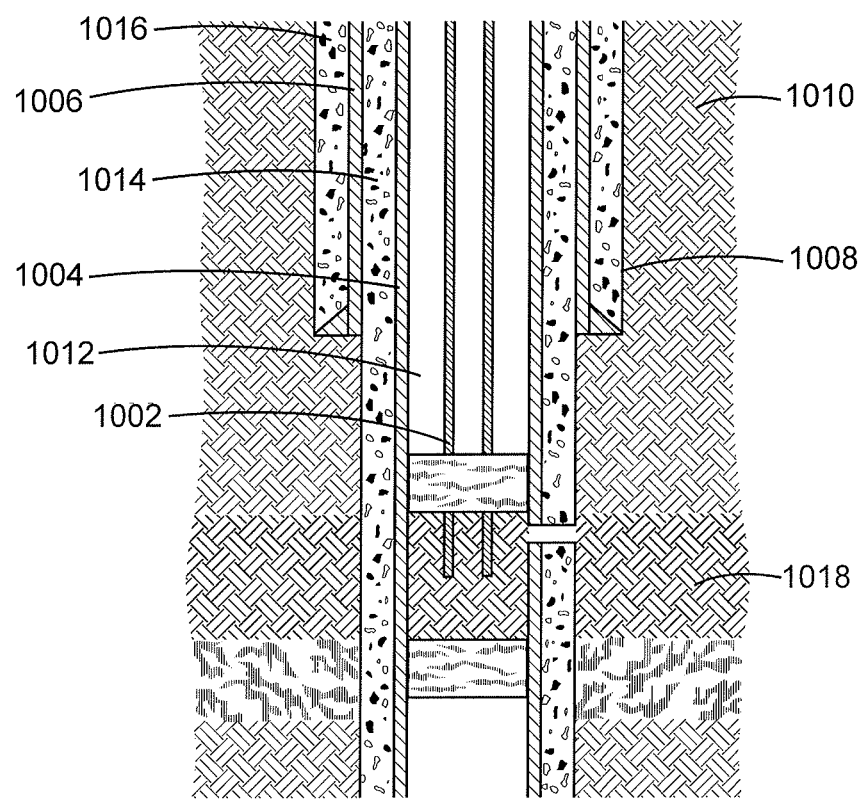
FIG. 1 is a diagram of an example production environment with multiple, concentric casings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to downhole drilling operations and, more particularly, to a hold-up tool with conformable sensors for highly-deviated or horizontal wells.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Hydrocarbons may be trapped in porous rock formations thousands of feet below the surface. Recovering the hydrocarbons typically requires drilling a borehole into the porous rock formation so that the hydrocarbons may be pumped to the surface. Metal pipes, referred to as casings, may be secured within the borehole as part of the hydrocarbon recovery operation. FIG. 1 is a diagram of an example production environment and illustrates casings 1002, 1004, and 1006 disposed within a borehole 1008 in a rock formation 1010. The casings 1002-1006 may be concentric or nearly concentric and secured within the borehole 1008 and each other through cement layers 1012, 1014, and 1016. The center casing 1002 may comprise a production casing through which hydrocarbon from the formation strata 1018 is received at the surface (not shown). The casings 1002-1006 may serve numerous purposes within a production and drilling environment, including preventing the borehole 1008 from collapsing after it is drilled and while it is being drilling, protecting a water table in the formation 1010 from contamination, and maintaining pressure within the borehole 1008. The term casing, as used herein, comprises the downhole casings described above as well as any tubing or tubular structures or fluid conduits that may contain fluids.

In a horizontal or highly-deviated (near-horizontal) well, hydrocarbons may flow through the production casing 1002 with other fluids in one of variety of flow regimes, such as stratified flow, plug flow, and gap flow. In certain instances, the flow regime may reflect downhole conditions and may affect the speed with which hydrocarbons are recovered at the surface. According to aspects of the present disclosure, a downhole tool with at least one conformable sensor may be positioned within a horizontal or highly-deviated well, within or near the production casing. As used herein, conformable sensors may comprise planar sensors that are printed or disposed on a flexible material that can conform to the shape of a surface with which it is in contact, and that provide for a high resolution, azimuthally sensitive measurement of a target. As will be described below, measurements from the conformable sensors may be used to characterize the fluids within the production casing, including the flow regime, fluid types, and fluid levels.

Figure 2B:
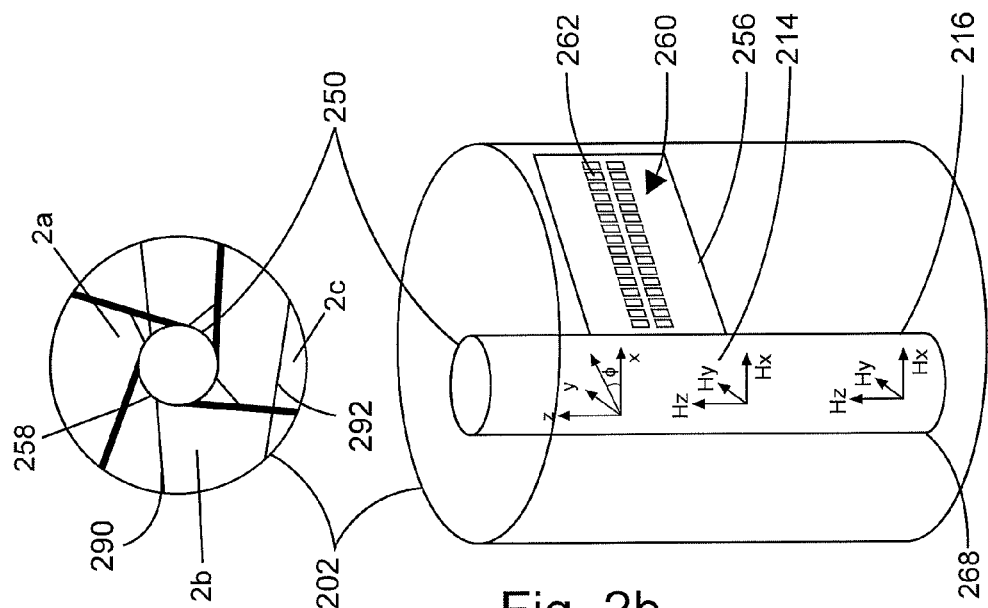
FIG. 2 is a diagram of a two example downhole tools with conformable sensors, according to aspects of the present disclosure.
Figure 2A:
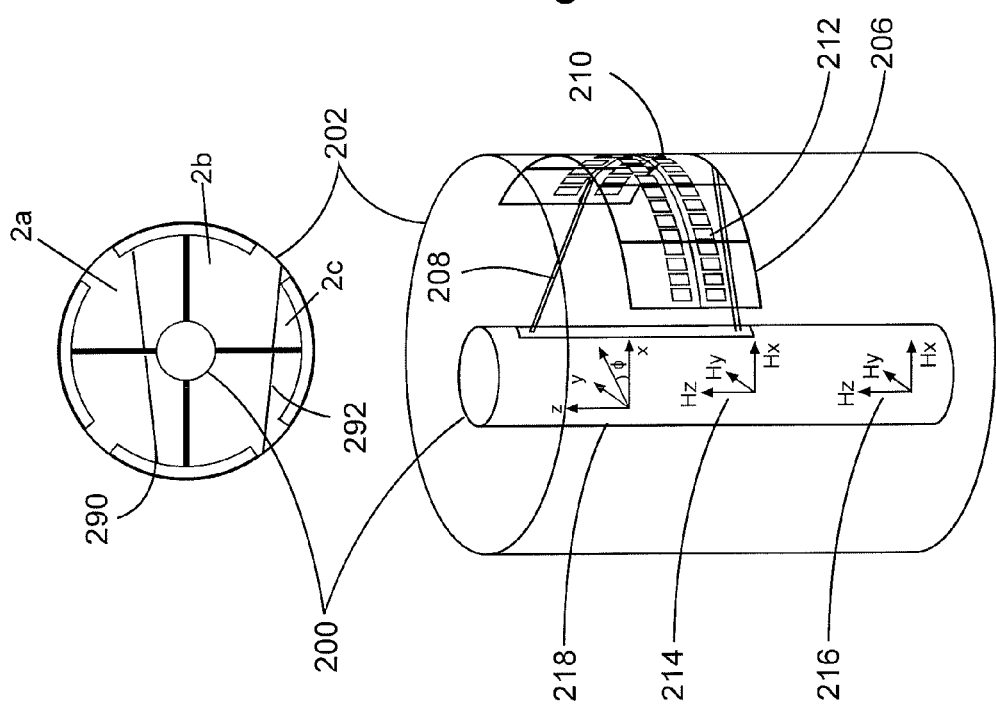

FIG. 2 is a diagram that shows two example downhole tools 200 and 250 with conformable sensors, according to aspects of the present disclosure. Both are shown disposed in a pipe 202. The pipe 202 may comprise a horizontal or highly-deviated production casing through which fluids $2a$, $2b$, and $2c$ are flowing in a segregated manner, separated by boundaries 290 and 292, based on their density and flow characteristics. The downhole tools 200 and 250 may comprise wireline hold-up tools that are physically and/or communicably coupled to a control unit (not shown) at the surface through a wireline or slickline, or any other conveyance. As used herein, a control unit may include an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), or any other digital or analog circuitry configured to interpret and/or execute program instructions and/or process data.

The tools 200 and 250 may comprise respective tool bodies 218 and 268, and at least one conformable sensor coupled to the respective tool bodies. For example, conformable sensor 212 is coupled to the tool body 218, and conformable sensors 262 is coupled to tool body 268. The conformable sensor 212 of tool 200 is one of an azimuthal array 210 of conformable sensors disposed on an pad 206 that is coupled to and extendable from a tool body 218 of the tool 200 through spring mechanisms or motorized arms 208. When extended, the pad 206 and conformable sensor 212 may contact the pipe 202. The elasticity of the pad 206 and tension in the arm 208 may be designed in such a way that the pad 206 will substantially deform to the shape of the pipe 202. Other pads similar to pad 206 may be arranged on different sides of the tool 200 to mechanically balance the tool 200 within the pipe 202. In other embodiments, expandable arms may be used opposite the pad 206 to mechanically balance the tool 200. In certain embodiments, the array 210 of conformable sensors may be arranged on the pad 206 to perform sensing at different azimuthal positions with respect to the tool body 218. In embodiments where multiple pads are used, each pad may include an array of conformable sensors to perform sensing at different azimuthal positions, and the pads may be arranged with respect to the tool body 218 such that there is full 360 degree coverage around the tool 200, where one pad covers one set of angles, and other stations cover other sets, providing full coverage.

In contrast to the downhole tool 200, the conformable sensor 262 of tool 250 is one of a radial array 260 of conformable sensors disposed on an pad 256 that is coupled to and extendable from a tool body 268 of the tool 250 through spring mechanisms or motorized arms 258. When extended, an outer edge of the pad 256 may come near to or contact the pipe 202. Other pads similar to pad 256 may be arranged on different sides of the tool 250. In certain embodiments, the radial array 260 of conformable sensors may collect measurements at different radial orientations with respect to the tool body 268. In embodiments where multiple pads are used, the pads may be azimuthally spaced around the tool body 268 such that measurements at the different radial orientations are made to cover a full 360 degrees the tool body 268, where one pad covers one set of angles, and other pads cover other sets, providing full coverage.

The conformable sensors 212 and 262 may include portions that function as transmitters that generate electromagnetic (EM) fields in a target, such as the fluids 2a-2c, and portions that function as receivers that receive and measure the current responses of the target to the generated EM fields. In certain embodiments, in addition to the conformable sensors 212 and 212, the downhole tools 200 and 250 may comprise separate transmitters 214 or receivers 216 mounted on the tool body 218. These additional transmitters 214 or receivers 216 may be inductive-type antennas, realized with coils, solenoids or rotating or moving magnets. In certain embodiments, EM fields may be generated and the corresponding current responses measured with any combination of the transmitter 214, the receiver 212, and the transmitters and receivers within the conformable sensors 212 and 262. As will be described below, the measured current responses may be processed at a control unit to identify physical parameters of the target and the parameters may be visualized to identify features of the target. Notably, when the transmitter is farther away from the receiver, in most cases the depth of investigation increases but the measurement resolution decreases. Additionally, the resolution of the measurements taken by a conformable sensor increases as the "stand-off" distance between the sensor and the target decreases.

In use, the downhole tool 200 may generate high resolution measurements at or near the pipe 202 by placing the pad 206 in contact with the pipe 202 and transmitting a time-varying EM signal from a transmitter of the conformable sensor 212. The signal may generate eddy currents in the pipe 202 and within the fluids 2a-2c where they interface with the pipe 202. The eddy currents may generate secondary currents that contain information about the parameters of the pipe 202 and the fluids 2a-2c, and the secondary currents may be measured at one or more receivers of the conformable sensor 112. The downhole tool 200 may further characterize the fluids 2a-2c by generating a time-varying EM signal at transmitter 214, and receiving the current response of the fluid 2a-2c at one of the receivers on the conformable sensor 212. This may provide a lower resolution measurement, but may provide a more robust characterization of the fluids around the downhole tool 200.

In contrast, the downhole tool 250 may perform high resolution, localized measurements within the fluid surrounding the tool 250 by transmitting a time-varying EM signal from a transmitter of the conformable sensor 262, and receiving the current response of the fluids 2a-2c at a receiver of the conformable sensor 262. In certain embodiments, the downhole tool 250 may generate lower resolution measurements of the fluids 2a-2c using at least one of the transmitter 214 and receiver 216 located on the tool body 268.

Figure 3:
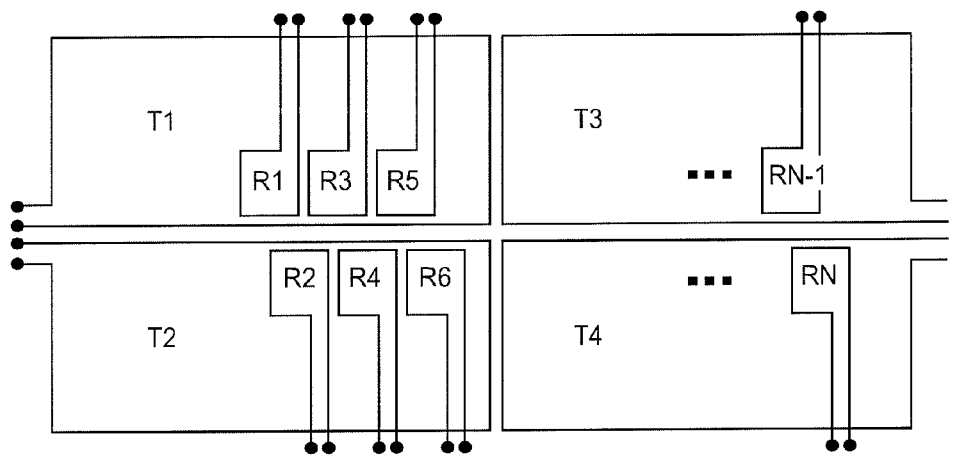
FIG. 3 is a diagram of example antenna windings for a conformable sensor, according to aspects of the present disclosure.

FIG. 3 is a diagram of example antenna windings for a conformable sensor, according to aspects of the present disclosure. The windings shown may comprise the windings for a single conformable sensor and may be formed by circuit printing or other deposition methods on a flexible surface (not shown). As can be seen, the windings include transmitters T1-T4 and staggered receivers R1-RN. The transmitters T1-T4 may comprise primary windings, while the staggered receivers R1-RN may comprise secondary windings. The number and size of the receiver pairs may determine the granularity and resolution of the measurements. Staggering the receivers may double the resolution of the sensor since more measurements are made per position. Although one example of antenna windings for a conformable sensor is shown in FIG. 3, other configurations are possible. For example, the size, number, and relative positions of the transmitters T1-T4 and receivers R1-RN may be altered, and the functionality of the receivers and transmitters can be switched, e.g., T1 may be a receiver and R3 may be a transmitter.

Ports of the transmitting and receiving windings (shown as circles) may be electrically connected to transmitter and receiver boards (not shown) that cause the transmitters T1-T4 to generate signals and cause the receivers R1-RN to measure the current responses caused by the generated signals. In certain embodiments, one or more of the transmitters T1-T4 may generate an EM signal in a target, and each of the receivers R1-RN may separately measure the response of the target to the signal. In certain embodiments, the combinations of transmitters and receivers used to generate EM signals and measure current responses may be varied dynamically by a control unit coupled to the transmitters T1-T4 and receivers R1-RN.

Figure 4:
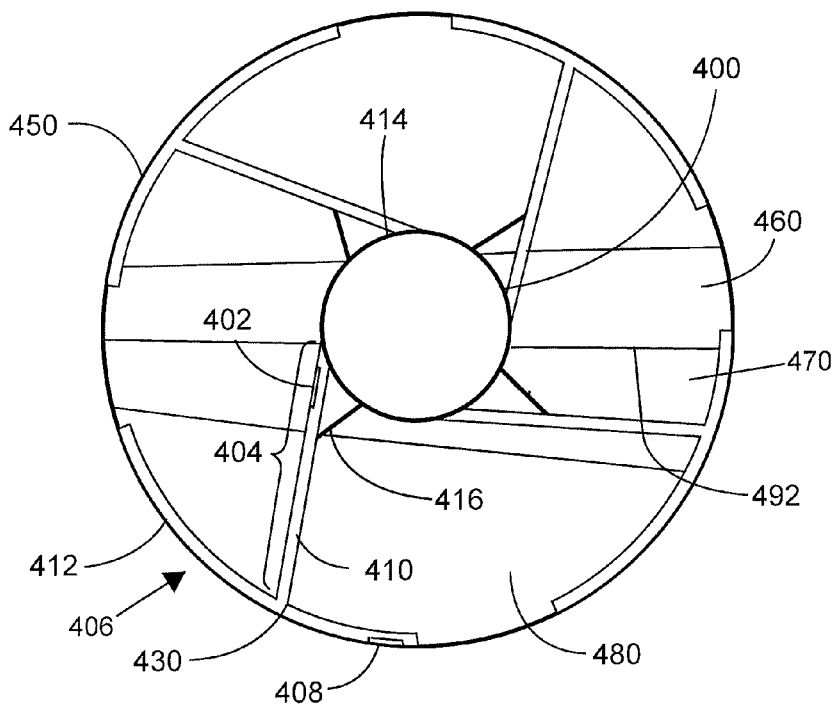
FIG. 4 is a diagram of another example downhole tool with conformable sensors, according to aspects of the present disclosure.

FIG. 4 is a diagram of an example downhole tool 400, according to aspects of the present disclosure. The downhole tool 400 is shown positioned within a casing 450 in a downhole environment. The downhole tool 400 comprises a conformable sensor 402 arranged in a radial array 404 of conformable sensors, and a conformable sensor 408 arranged in an azimuthal array 406 of conformable sensors. The radial array 404 and azimuthal array 406 may be positioned on flexible pads 410 and 412, respectively. The pad 410 may be coupled to and extendable from a tool body 414 of the downhole tool 400 through an extendable arm 416. When extended, the pad 410 may form a generally planar surface forming a tangent from a surface of the tool body 414. In certain embodiments, the pad 412 may be coupled to the pad 410, such as through a hinge mechanism 430. When the pad 410 is extended by the arm 416, the pad 412 may contact the casing 450, substantially conforming to the shape of the casing 450. Notably, when the pad 412 is in contact within the casing 450, the conformable sensor 408 may also contact the casing 450, and may provide a high resolution, azimuthally sensitive measurements of the casing 450.

The downhole tool 400 may provide for robust and complete measurements of fluids 460, 470, and 480 within the casing 450. In particular, the downhole tool 400 may provide high resolution measurements of the fluids as they interface with the casing 450 using the azimuthal array 406. The downhole tool 400 may also generate high resolution measurements using sensors disposed at different radial positions within the fluids, such as the conformable sensor 402 in the radial array 404. For example, the conformable sensor 402 may generate high-resolution measurements at the boundary 492 between fluids 460 and 470. Conformable sensor 408, on the other hand, may generate high resolution measurements of the interface between fluid 480 and the casing 450, and also of the fluid 480 itself, which may be used to determine the composition of the fluid 480. In certain embodiments, the downhole tool 400 may generate measurements of the fluids within the casing but away from the conformable sensor arrays using remote transmitters and receivers (not shown) located apart from the conformable sensor arrays.

Figure 5:
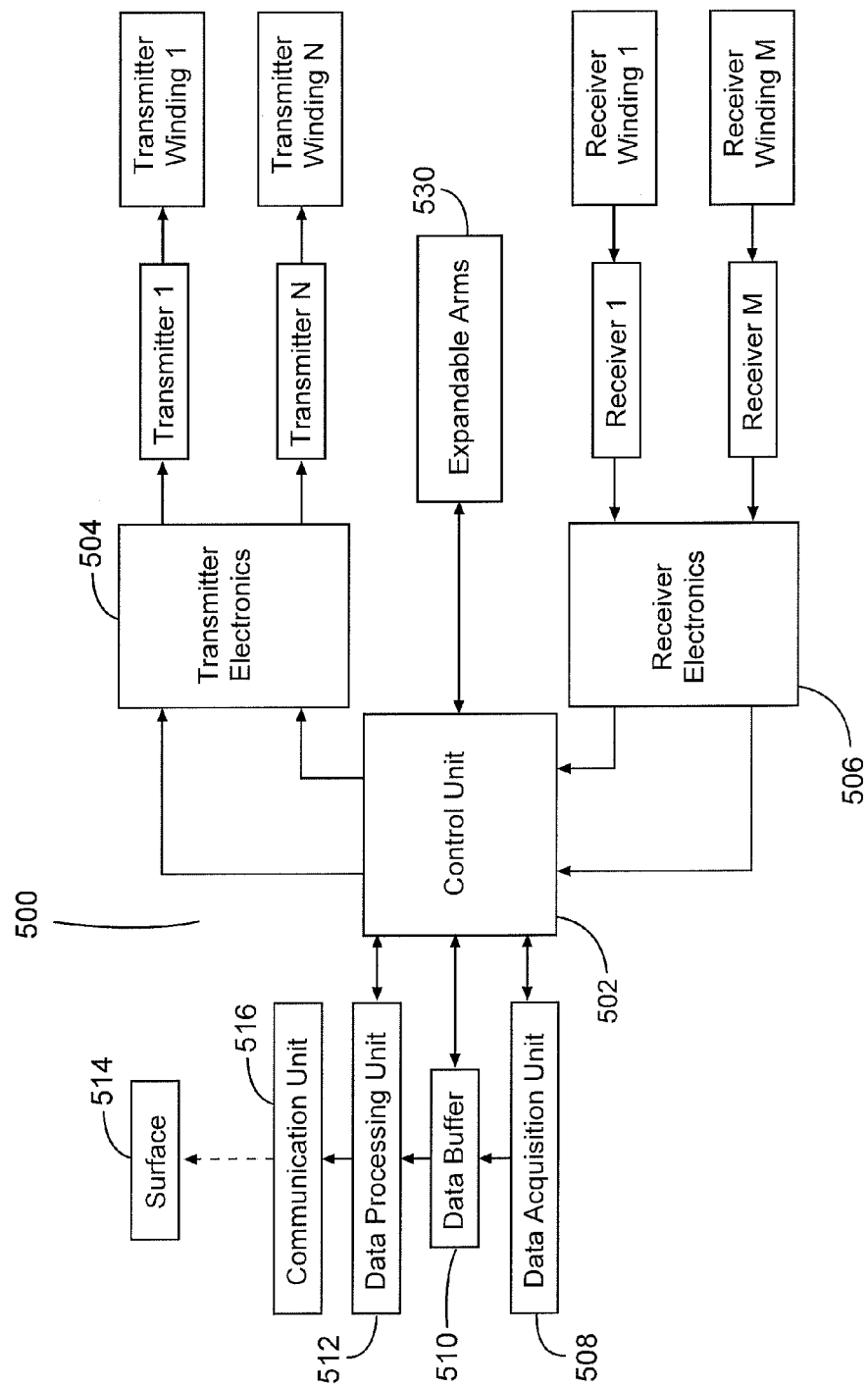
FIG. 5 is a diagram of an example control system for a downhole tool with conformable sensor array, according to aspects of the present disclosure.

In certain embodiments, an example downhole tool with at least one conformable sensor, as described above, may comprise a control system to control when and how the EM signals are transmitted and the responses are measured. FIG. 5 is a diagram of an example control system 500 for a downhole tool with a conformable sensor, according to aspects of the present disclosure. The system 500 comprises a control unit 502 that may function as the primary controller for the tool and may be communicably coupled to transmitters 1-N through transmitter electronics 504, to receivers 1-M through receiver electronics 506, and to mechanical, electrical or hydraulic elements 530 coupled to and configured to extend pads to which the transmitters 1-N and receivers 1-M coupled. At least some of the transmitters 1-N and receivers 1-M may comprise elements of conformable sensors located, for example, in a radial array, in an azimuthal array, or in radial and azimuthal arrays. The transmitter electronics 404 and receiver electronics 406 may comprise circuit boards to which some or all of the transmitters 1-N and receivers 1-M are coupled.

The control unit 502 may trigger the transmitter electronics 504 to generate a time-varying EM signal through one or more of the transmitters 1-N. The time-varying EM signal may be a sinusoidal signal, its phase and amplitude set at a desired value. As is described above, the EM signals generated through the transmitters 1-N may generate eddy currents in fluids or downhole pipes that are in immediate contact with the conformable sensors, and the eddy currents may generate secondary currents that contain information about the fluids or downhole pipes. The secondary currents may be measured at the receivers 1-M. In the case of a frequency domain operation, the measurements from the receivers 1-M may be represented as voltage or current numbers in complex domain with real and imaginary parts, in phasor domain as amplitude and phase, or any other domain that can be obtained by analytical mapping from any of these domains. In the case of a time domain operation, the measurements from the receivers 1-M may be represented as magnitudes as a function of time which can be positive or negative. Results from time and frequency domain can be transferred from one to another by using Fourier transform or inverse Fourier transform.

The control unit 502 may receive the measurements from the receivers 1-N through the receiver electronics 506 and may transmit the measurements to the data acquisition unit 508. For a specific transmitter excitation, measurements from multiple receivers can be generated and received at the same time. Similarly, multiple transmitters 1-N can be excited at the same time and they can be time, frequency or jointly multiplexed for latter demultiplexing operation at the receivers. Upon reception at the data acquisition unit 508, the measurements may be digitized, stored in a data buffer 510, preprocessed at data processing unit 512, and sent to the surface 514 through a communication unit 516, which may comprise a downhole telemetry system.

In certain embodiments, the control unit 502 may further select the combinations of the transmitters and receivers to use to make measurements. The control center 502 may comprise a set of instructions and may generate control signals to the transmitter and receiver electronics based, at least in part, on the instructions. For example, the control center 502 may issue control signals to the transmitter and receivers to take different types of measurements within certain time periods. Example types of measurements include measurements with low-depth of investigations, medium depth of investigation, and high depth of investigation.

In certain embodiments, the resulting measurements may be aggregated and processed to determine at least one parameter of the fluids within a casing. In certain embodiments, processing the measurements may comprise processing the measurements using a control unit located either within the downhole tool or the surface above the downhole tool. When processed at the surface, the measurements may be communicated to the surface in real time, such as through a wireline, or stored in a downhole tool and later processed when the tool is retrieved to the surface. The measurements may be processed with an inversion algorithm stored as a set of instructions in a memory device of the control unit and executable by a processor of the control unit. The inversion algorithm may be specific to the environment in which the downhole tool is used and may be designed to identify fluid parameters within a highly deviated or horizontal well.

Figure 6:
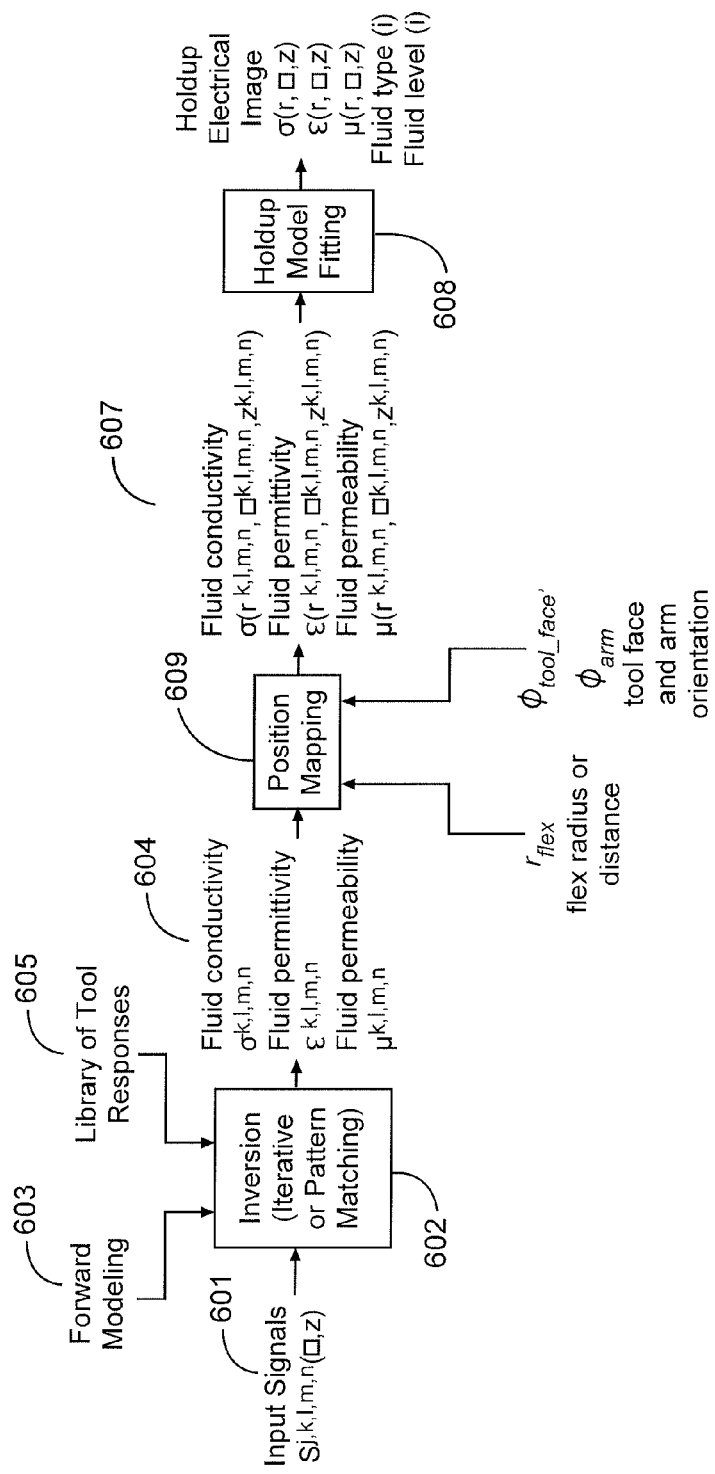
FIG. 6 is a block diagram of an example inversion algorithm, according to aspects of the present disclosure.

FIG. 6 is a block diagram on an example inversion algorithm for a hold-up tool in a horizontal of highly-deviated casing in a downhole environment, according to aspects of the present disclosure. An input signal 601 may comprise measurements from the receivers of conformable sensors on the downhole tool. In certain embodiments, the input signals may be divided into time components and may be identified by the receiver which made the measurement and the transmitter that generated the eddy current/secondary current measured by the receiver.

The inversion algorithm further may comprise an inversion block 602, which may receive and process the input signals to determine fluid parameters for the fluids within the casing. In certain embodiments, the inversion block 602 may receive a model 603 corresponding to a model of a downhole tool in a fluid distribution. The inversion block 602 may implement a cost function to determine fluid parameters 604 that produce the minimum mismatch between the model 603 and the input signals 601. The cost function may be defined, for example, by utilizing least squares minimization through $L_2$ norm. The inversion block 603 may output the model fluid parameters 604, example of which are fluid conductivity, permittivity and permeability.

In certain embodiments, a library 605 of fluid responses to different signals can be used instead of or in addition to the model 603. For example, the library 605 may be used if the parameter dimensions of the fluid responses are low in number and also small in range, so that an accurate library can be calculated. If library 605 is used, a multi-dimensional interpolation can be used to obtain the fluid parameters closest to the measurements reflected in the input signal 501.

In certain embodiments, the fluid parameters 604 may be received at a position mapping element 606 of the inversion algorithm 600. The position mapping element 606 may account for the positions of each of the sensors used to measure the fluid and, therefore, the position of each measurement. In certain embodiments, the position mapping element 606 may account for the positioning of each sensor and resulting measurement utilizing geometrical calculations that involve pad flexing characteristics and also tool face angle and arm orientation. For transmitter and receiver pairs that are not collocated, an effective measurement position can be identified. The position mapping element 606 may generate an output 607 that includes the fluid parameters and the corresponding position of the fluid parameters with respect to the tool.

The output 607 may be received at a hold-up model 608. The output 607 may be fit to the hold-up model 608, which incorporates typical arrangements and distributions of fluids within a casing. In certain embodiments, the hold-up model 608 may be selected from multiple hold-up models corresponding to different types of fluid regimes and distributions, based, at least in part, on the output 607. One example hold-up model is a model with parallel, horizontal intra-fluid boundaries, different fluid types/conductivities, and different numbers of layers, where the fluids within the model are indexed with value i. Another example for the hold-up model is non-parallel intra-fluid boundaries with different dip angles, different boundary heights, different fluid types/conductivities and different numbers of layers. The model 608 may output a hold-up image corresponding to the fluid distribution with the casing, as well as the fluid types and levels within the casing, all of which can be visualized for production decisions.

Figure 7:
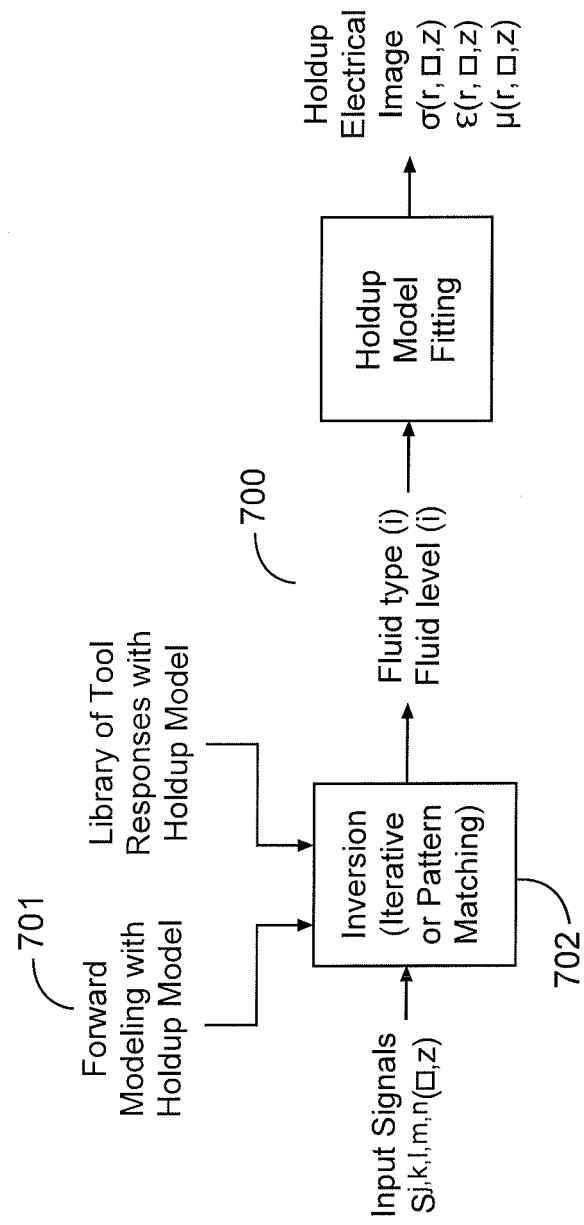
FIG. 7 is a block diagram of another example inversion algorithm, according to aspects of the present disclosure.

FIG. 7 is a diagram of another example inversion algorithm for a hold-up tool, according to aspects of the present disclosure. The inversion algorithm 700 may receive similar input signals as the inversion algorithm 600, but may incorporate the hold-up model 701 within the inversion block 702, instead of first inverting the input signals 701 to determine fluid parameters. Fluid parameters that best match with the input signals 701 may be identified, and the resulting fluid types and levels may be obtained through numerical optimization and output. A hold-up image may then be calculated for the fluids within the casing. Although the resulting hold-up image from inversion algorithm 700 might be of a lower resolution than the one from inversion algorithm 700, it may provide for faster processing in cases where a good initial guess on the hold-up distribution exists.

According to aspects of the present disclosure, an example method for downhole fluid measurement may include positioning a first sensor within a downhole casing. The first sensor may include a first flexible material, a first transmitter coupled to the first flexible material, and a first receiver coupled to the first flexible material. A first signal within a fluid in the downhole casing may be generated using the first transmitter. A first response of the fluid to the first signal may be measured using the using the first receiver. The first response may be processed to determine at least one parameter of the fluid.

In certain embodiments, the first sensor may be one of a radial array of sensors and an azimuthal array of sensors positioned on a first pad extending from a downhole tool. A second sensor may be positioned within the downhole casing, with the second sensor comprising a second flexible material, a second transmitter coupled to the second flexible material; and a second receiver coupled to the second flexible material. The second sensor may be one of an azimuthal array of sensors positioned on a second pad extending from the downhole tool. In certain embodiments, the first sensor may be one of a radial array of sensors, the second sensor may be one of an azimuthal array of sensors, and the second pad may be coupled to an end of the first pad opposite the downhole tool. In certain embodiments, the second sensor may be one of a radial array of sensors, the first sensor may one of an azimuthal array of sensors, and the first pad may be coupled to an end of the second pad opposite the downhole tool.

In any of the embodiments described in the preceding two paragraphs, the method may further comprise generating a second signal within the fluid in the downhole casing using the second transmitter. A second response of the fluid to the second signal may be measured using the second receiver. And the second response may be processed to determine at least one parameter of the fluid.

In any one of the embodiments described in the preceding three paragraphs, the at least one parameter of the fluid comprises a fluid conductivity, permittivity, and/or permeability. In any one of the embodiments described in the preceding three paragraphs, the method may further comprise generating at least one of a hold-up image of the fluid, a fluid type, and a fluid level of the fluid based on the at least one parameter of the fluid. In any one of the embodiments described in the preceding three paragraphs, the first receiver may be one of a plurality of receivers of the first sensor.

According to aspects of the present disclosure, an example system includes a first sensor coupled to a downhole tool. The first sensor may comprise a first flexible material, a first transmitter coupled to the first flexible material, and a first receiver coupled to the first flexible material. A control unit may be communicably coupled to the downhole tool, the control unit comprising a processor and a memory device coupled to the processor, the memory device containing a set of instructions that, when executed by the processor, causes the processor to receive from the first receiver a first response of a fluid within a downhole casing to a first signal generated by the first transmitter; and process the first response to determine at least one parameter of the fluid.

In certain embodiments, the first sensor may be one of a radial array of sensors and an azimuthal array of sensors positioned on a first pad extending from a downhole tool. In certain embodiments, the system may further comprise a second sensor coupled to the downhole tool, the second sensor comprising a second flexible material; a second transmitter coupled to the second flexible material; and a second receiver coupled to the second flexible material. The second sensor may be one of an azimuthal array of sensors positioned on a second pad extending from the downhole tool. The first sensor may one of a radial array of sensors, the second sensor may be one of an azimuthal array of sensors, and the second pad may be coupled to an end of the first pad opposite the downhole tool. The second sensor may be one of a radial array of sensors, the first sensor may be one of an azimuthal array of sensors, and the first pad may be coupled to an end of the second pad opposite the downhole tool.

In any of the embodiments described in the preceding two paragraphs, the set of instructions may further cause the processor to generate a second signal within the fluid in the downhole casing using the second transmitter, measure a second response of the fluid to the second signal using the second receiver, and process the second response to determine at least one parameter of the fluid. In any of the embodiments described in the preceding two paragraphs, the at least one parameter of the fluid comprises a fluid conductivity, permittivity, and/or permeability. In any of the embodiments described in the preceding two paragraphs, the set of instructions further causes the processor to generate at least one of a hold-up image of the fluid, a fluid type, and a fluid level of the fluid based on the at least one parameter of the fluid. In any of the embodiments described in the preceding two paragraphs, the first receiver may be one of a plurality of receivers of the first sensor.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A method for downhole fluid measurement, comprising positioning a first sensor within a downhole casing, the first sensor comprising a first flexible material; a first transmitter coupled to the first flexible material; and a first receiver coupled to the first flexible material; generating a first signal within a fluid in the downhole casing using the first transmitter; measuring a first response of the fluid to the first signal using the first receiver; processing the first response to determine at least one parameter of the fluid, wherein the first sensor is one of a radial array of sensors and an azimuthal array of sensors positioned on a first pad extending from a downhole tool; and further comprising positioning second sensor within the downhole casing, the second sensor comprising a second flexible material; and at least one of a second transmitter or a second receiver coupled to the second flexible material.

2. The method of claim 1, wherein the second sensor is one of anazimuthal array of sensors positioned on a second pad extending from the down hole tool.

3. The method of claim 2, wherein the first sensor is one of a radial array of sensors, the second sensor is one of an azimuthal array of sensors, and the second pad is coupled to an end of the first pad opposite the downhole tool.

4. The method of claim 2, wherein the second sensor is one of a radial array of sensors, the first sensor is one of an azimuthal array of sensors, and the first pad is coupled to an end of the second pad opposite the downhole tool.

5. The method of claim 2, further comprising
generating a second signal within the fluid in the downhole casing using the second transmitter;
measuring a second response of the fluid to the second signal using the second receiver; and
processing the second response to determine at least one parameter of the fluid.

6. The method of claim 1, wherein the at least one parameter of the fluid comprises a fluid conductivity, permittivity, and/or permeability.

7. The method of claim 1, further comprising generating at least one of a hold-up image of the fluid, a fluid type, and a fluid level of the fluid based on the at least one parameter of the fluid.

8. The method of claim 1, wherein the first receiver is one of a plurality of receivers of the first sensor.

9. A system for downhole fluid measurement, comprising: a first sensor coupled to a downhole tool, the first sensor comprising: a first flexible material; a first transmitter coupled to the first flexible material; and a first receiver coupled to the first flexible material; a control unit communicably coupled to the downhole tool, the control unit comprising a processor and a memory device coupled to the processor, the memory device containing a set of instructions that, when executed by the processor, causes the processor to receive from the first receiver a first response of a fluid within a downhole casing to a first signal generated by the first transmitter; process the first response to determine at least one parameter of the fluid, wherein the first sensor is one of a radial array of sensors and an azimuthal array of sensors positioned on a first pad extending from a downhole tool, and further comprising a second sensor coupled to the downhole tool, the second sensor comprising a second flexible material; and at least one of a second transmitter coupled to the second flexible material and or a second receiver coupled to the second flexible material.

10. The system of claim 9, wherein the second sensor is one of an azimuthal array of sensors positioned on a second pad extending from the downhole tool.

11. The system of claim 10, wherein the first sensor is one of a radial array of sensors, the second sensor is one of an azimuthal array of sensors, and the second pad is coupled to an end of the first pad opposite the downhole tool.

12. The system of claim 10, wherein the second sensor is one of a radial array of sensors, the first sensor is one of an azimuthal array of sensors, and the first pad is coupled to an end of the second pad opposite the downhole tool.

13. The system of claim 10, wherein the set of instructions further causes the processor to:
generate a second signal within the fluid in the downhole casing using the second transmitter;
measure a second response of the fluid to the second signal using the second receiver; and
process the second response to determine at least one parameter of the fluid.

14. The system of claim 9, wherein the at least one parameter of the fluid comprises a fluid conductivity, permittivity, and/or permeability.

15. The system of claim 9, wherein the set of instructions further causes the processor to generate at least one of a hold-up image of the fluid, a fluid type, and a fluid level of the fluid based on the at least one parameter of the fluid.

16. The system of claim 9, wherein the first receiver is one of a plurality of receivers of the first sensor.

* * * * *